United States Patent [19]
Ohrui et al.

[11] 3,859,175
[45] Jan. 7, 1975

[54] PROCESS FOR PURIFYING ACRYLIC ACID BY PLURAL STAGE DISTILLATION AND AN EXTRACTION

[75] Inventors: Tetsuya Ohrui, Niihama; Yasuhito Sakakibara, Saijo; Yukinaga Aono, Niihama; Michio, Kato, Niihama; Hiroshi Takao, Niihama; Masami Ayano, Niihama, all of Japan

[73] Assignee: Sumitomo Chemical Company, Limited, Osaka, Japan

[22] Filed: May 21, 1973

[21] Appl. No.: 362,210

[30] Foreign Application Priority Data
May 24, 1972 Japan.............................. 47-51843
May 24, 1972 Japan.............................. 47-51846

[52] U.S. Cl............... 203/46, 203/75, 203/76, 203/96, 203/DIG. 21, 260/526 N, 203/51
[51] Int. Cl............................................. C07c 57/04
[58] Field of Search.................... 203/77, 43–46, 203/74, 75, 60, 62, 69, 70, 51, 96, DIG. 21, 81, 78, 76, 79, 80; 260/526 N

[56] References Cited
UNITED STATES PATENTS
| | | | |
|---|---|---|---|
| 2,922,815 | 1/1960 | Faerber................. | 203/62 |
| 3,344,178 | 9/1967 | Brown et al. ............ | 203/46 |
| 3,433,831 | 3/1969 | Yomiyama et al................ | 203/51 |
| 3,507,915 | 4/1970 | Newman.................... | 260/526 N |
| 3,527,677 | 9/1970 | Harpring.................. | 203/60 |
| 3,553,261 | 1/1971 | Sennewald et al............ | 260/526 N |
| 3,657,332 | 4/1972 | Sennewald et al............ | 260/526 N |
| 3,666,632 | 5/1972 | Honda et al. ................ | 260/526 N |
| 3,689,541 | 9/1972 | Sennewald et al............. | 260/526 N |

Primary Examiner—Wilbur L. Bascomb, Jr.
Attorney, Agent, or Firm—Stevens, Davis, Miller & Mosher

[57] ABSTRACT

Acrylic acid is purified from an aequeous solution containing acrylic acid and acetic acid, by distilling azeotropically with a dual solvent consisting of the first component capable of forming an azeotropic mixture with acrylic acid, acetic acid and water and the second component having a lower boiling point than that of acetic acid in a distillation column under a pressure of 300 mmHg absolute or less to distill off substantially all of acetic acid, water and the second component together with some portions of the first component at the head of the column and then distilling the resulting bottoms containing acrylic acid and the first component, almost free from acetic acid, in another distillation column under a pressure of 300 mmHg absolute or less, using water as an entrainer for the first component, where acrylic acid is obtained at a high concentration in water from the bottom.

4 Claims, 1 Drawing Figure

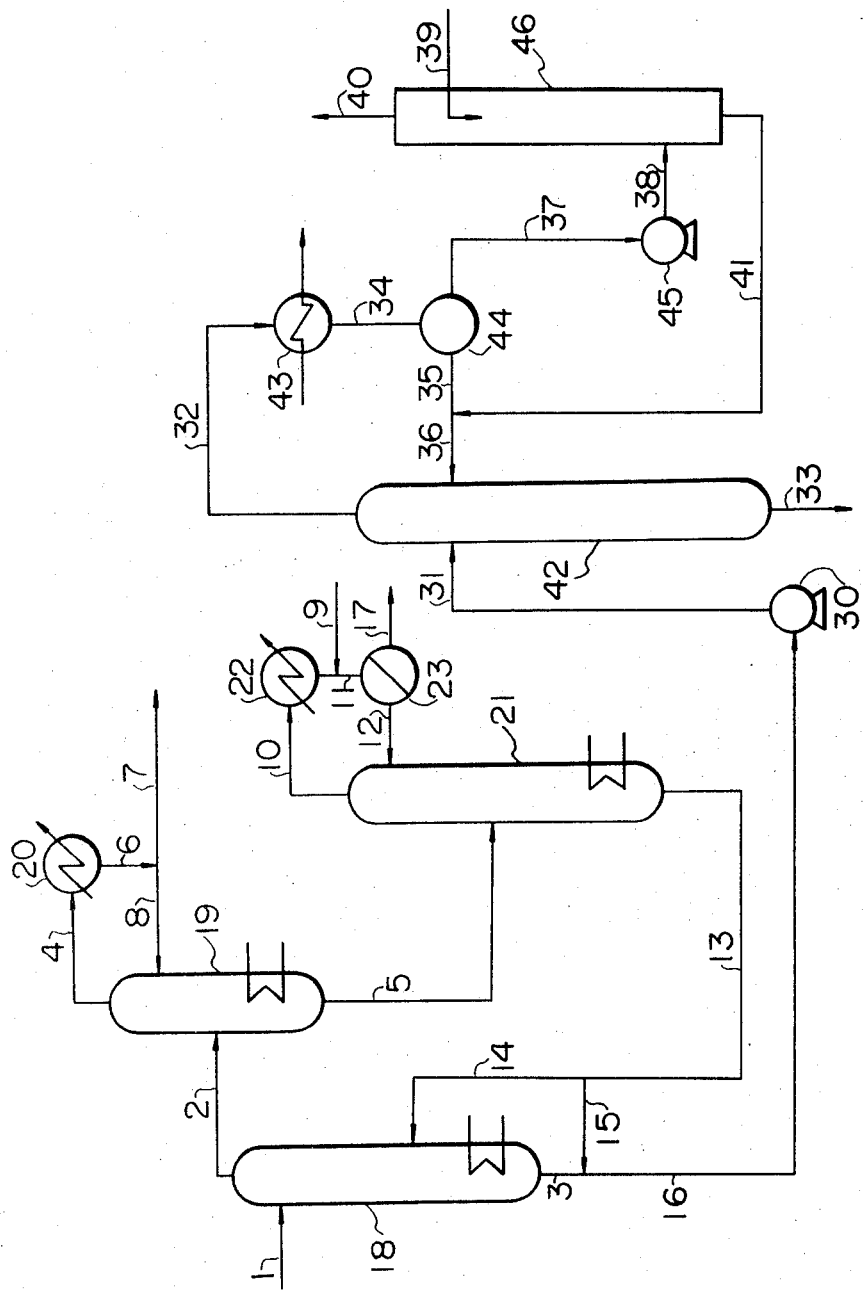

PROCESS FOR PURIFYING ACRYLIC ACID BY PLURAL STAGE DISTILLATION AND AN EXTRACTION

This invention relates to a process for separating acrylic acid from aqueous crude acrylic acid containing acrylic acid together with acetic acid.

The reaction product obtained by direct oxidation of propylene usually contains acrolein, acetic acid and propionic acid in addition to acrylic acid as a major component. Among these components, acrolein can be readily separated from a crude acrylic acid containing the same, because there is a large difference in boiling point between acrolein and acrylic acid. However, it is impossible to remove propionic acid from crude acrylic acid containing a small amount of propionic acid by distillation, because propionic acid has almost same boiling point as that of acrylic acid (both 141°C), but fortunately the yield of propionic acid is very small, for example, 0.1 wt. percent or less, based on the produced acrylic acid. Therefore, propionic acid has almost no practical problem at all. On the other hand, acetic acid is usually produced as a byproduct in an amount of 3 to 15 wt. percent, based on the produced acrylic acid, though dependent upon a catalyst used in the propylene oxidation and reaction conditions, and therefore it is necessary to separate acetic acid from acrylic acid containing the same and purify acrylic acid. The boiling point of acetic acid is 118°C, and it is difficult to remove acetic acid from a mixture of acrylic acid and acetic acid by the ordinary distillation.

To overcome this problem of the separation of acetic acid from acrylic acid containing acetic acid, it has been proposed to use a suitable entrainer and azeotropically distill off acetic acid. It is known that toluene, methylcyclohexanone, n-heptane, diisobutylene, etc. are effective as the entrainer. Indeed, acetic acid can be removed by an azeothropic distillation, but a considerably larger amount of the entrainer must be separated from acrylic acid than that of acetic acid contained in crude acrylic acid. The boiling points of these entrainers usually ranges from 100° to 110°C, and the entrainers are not always easy to separate from acrylic acid. Furthermore, acrylic acid is also transferred into the entrainer obtained by azeotropically distilling acetic acid at the top of a distillation column, in addition to acetic acid, and therefore acrylic acid must be separated from an azeotropic mixture containing same and recovered. Loss of acrylic acid will be larger, if the acrylic acid is not recovered from the distillate entrainer. Therefore, in the known process for separating acetic acid from acrylic acid by azeotropic distillation there are involved very difficult and troublesome operations. Therefore, the known process is not advantageous from the viewpoint of economy and operation.

The present inventors previously found a process for extracting acrylic acid from a mixture containing acrylic acid with a solvent mixture of methylethylketone and at least one of xylenes selected from o-xylene, p-xylene, m-xylene and ethylbenzene. In said process, it is necessary to separate acrylic acid and acetic acid from a mixture consisting of acrylic acid, acetic acid and the solvent mixture as an extracting solvent.

According to the present invention, a mixture containing acrylic acid, acetic acid, water, and a dual organic solvent consisting of a first component capable of forming an azeotropic mixture with acrylic acid acetic acid and water (which will be referred to an "the first component") a second component having a lower boiling point than that of acetic acid (which will be referred to as "the second component") is fed to a top of the first distillation column to be distilled under a pressure of 300 mmHg absolute or less, and distilled. A solution of acrylic acid, which contains acrylic acid at a high concentration and in addition some of the first component, is obtained from the bottom of the column. All of the second component, the other part of the first component, all of water and 10 wt. percent or more of the feed of acrylic acid are distilled off from the top of the column together with acetic acid, and fed directly to a tray at a middle stage of the second distillation column which is operated under a reduced pressure of 300 mmHg absolute or less. The second component and water are obtained from the top of the second distillation column, and a solution containing acrylic acid, the first component and acetic acid to be concentrated is obtained from the bottom of the second distillation column. The bottoms are further fed to a tray at a middle stage of the third distillation column, and distilled at a reduced pressure of 300 mmHg absolute or less. A solution containing acetic acid and the first component is obtained from the top of the third distillation column, and a solution containing acrylic acid and the first component are obtained from the bottom of the third distillation column. The bottoms from the third distillation column are fed to the first distillation column or added to the bottoms of the first distillation column, depending upon the content of acetic acid in the bottoms of the third distillation column. The first component forms an azeotropic solution with acrylic acid, and it is impossible to separate acrylic acid from the azeotropic mixture by the ordinary distillation.

According to the present invention, acrylic acid is separated from the bottoms of the first distillation column in the following manner:

The solution of acrylic acid in said first component is fed to the top of the fourth distillation column and distilled under a pressure of 300 mmHg or less, with water as an entrainer for said first component solvent. An azeotropic mixture of water and said first component containing acrylic acid is distilled off from the top of the fourth distillation column, and is separated into an oil layer and an aqueous layer in the decanter. The oil layer containing the first component and acrylic acid is fed to an extraction column, wherein acrylic acid is extracted with water as an extracting medium and the first component is recovered. The amount of water added into the extraction column as extracting agent is usually 2 to 30 percent by weight on the basis of the amount of acrylic acid discharged from the bottom of the fourth distillation column. The extract containing extracted acrylic acid is joined with the aqueous layer separated in the decanter and refluxed to the fourth distillation column. An aqueous solution containing acrylic acid at a high concentration is obtained from the bottom of the fourth distillation column.

The first component used in the present invention is in an azeotropic relation with acrylic acid and acetic acid, and includes, for example, ethyl benzene, o-xylene, m-xylene, p-xylene, and octane. The second component has a boiling point lower than that of acetic acid, and includes, for example, methylethylketone, methyl acetate, and ethyl acetate. The weight ratio of the first component to the second component is from 1 : 9 to 9 : 1, preferably from 2 : 8 to 5 : 5. The amount of the solvent system consisting of the first component and the second component used in the present invention is usually from 0.1 to 10 parts by weight, preferably from 0.2 to 5 parts by weight on the basis of the amount of the feed mixture containing acrylic acid, acetic acid, and water.

Now, the present invention will be explained in detail by way of the accompanying drawing.

The sole FIGURE is a schematic flow diagram showing one embodiment of the present invention.

A mixture comprising acrylic acid, acetic acid, water and a dual solvent of the first component and the second component is fed to the first distillation column 18 through a line 1. The first distillation column is operated under a reduced pressure of 300 mmHg absolute or less, especially 100 mmHg absolute or less, and heated by a reboiler at the bottom of the column, while adjusting distillate vapors to such a degree that all of the second component, acetic acid, and water, and 10 wt. percent or more of the feed of acrylic acid can be distilled off from the top of the column. At that time, 20 to 70 wt. percent of the feed of the first component from the line 1 is also distilled off from the top of the column. A solution of acrylic acid in the first component containing a very small amount of acetic acid is obtained from a line 3. In the present invention the required number of trays in a distillation column is much less than that of an ordinary distillation, approximately one-half or acrylic acid with a separation one-third of number of trays of the ordinary distillation. Thus, the present invention is very effective for reducing the pressure drop of the distillation column. Vapor components distilled off from the top of the first distillation column 18 are fed to the second distillation column 19 through a line 2. It is also possible to feed the vapor components to the column 19 from the column 18 through the line 2 after condensation, but this is not advantageous from the viewpoint of heat economy. The second distillation column 19 is provided with an auxiliary reboiler at the bottom of the column to establish a heat balance, and vapors containing the second component water and some of the first component are obtained from the top of the column. The vapors are fed to a condenser 20 from a line 4 and condensed therein. A portion of the condensate is refluxed to the column 19 through lines 6 and 8. The reflux can be an oil layer, or aqueous layer or both oil and aqueous layers, but the reflux is usually carried out at a reflux ratio of about 1. A solution containing the second component as the main component is obtained through lines 6 and 7. On the other hand, a solution containing 40 to 70 percent by weight of the first component, 10 to 30 percent by weight of acrylic acid and 10 to 30 percent by weight of acetic acid is discharged from the bottom of the second distillation column 19 through a line 5, and is fed to the third distillation column 21. The third distillation column 21 is also operated under a reduced pressure of 300 mmHg absolute or less, especially 100 mmHg absolute or less. An azeotropic mixture of acetic acid-the first component, or vapors having a composition approximate to that of the azeotropic mixture is obtained from the top of the column 21 through a line 10, and fed to a condenser 22. The condensate is fed to a decanter 23 through a line 11, but at that time the acetic acid contained in the condensate is washed out into the aqueous layer with water supplied from a line 9 and withdrawn to the outside of the system through a line 17. On the other hand, the first component is refluxed to the third distillation column 21 through a line 12. A solution of acrylic acid in the first component, from which acetic acid has been removed, is discharged from the bottom of the third distillation column 21 through a line 13, and fed to a tray at a proper level of the first distillation column 18, depending upon the content of acetic acid. When several percent of acetic acid is contained in the solution, the solution is returned to the first distillation column 18 through a line 14, where acetic acid is further separated. When acetic acid is removed from the solution to such a degree as to sufficiently satisfy the requirement in the third distillation column 21, the solution is joined, through a line 15, together with the bottoms of the first distillation column 18, which is obtained through a line 3, and withdrawn from line 16. The former procedure of returning the solution to the first distillation column is more advantageous because of the reduced total number of the trays in the third distillation column.

In this manner, the lower boiling point components than acetic acid, that is, the second component and water are separated together with acetic acid under the most favorable conditions for removing acetic acid in the first distillation column, and a solution of acrylic acid in the first component is obtained from the bottom of the column. In the second distillation column, the second component and water are distilled off and in the third distillation column acetic acid is distilled off. Furthermore, there are a large amount of the first component in the third distillation column and the first component azeotropically boils with acetic acid. Thus, acetic acid can be separated under very advantageous conditions.

Toluene, n-heptane, diisobutylene, and the like have been proposed as the entrainer for acetic acid, but they entrain a small quantity of acetic acid and have no practical utility, contrary to their alleged ones. As the entrainer, only those capable of forming an azeotropic mixture of a high content of acetic acid, for example, xylenes or ethylbenzene, have a practical utility. Furthermore, in the third distillation column, removal of acetic acid to the outside of the system is carried out, and it is not necessary to reduce the concentration of acetic acid at the bottom to a very low one. Generally, the acetic acid concentration of the bottoms is reduced to several percents, and the bottoms are fed to the first distillation column, wherein the acetic acid concentration is further reduced. The latter procedure is more advantageous. As compared with the ordinary distillation process for merely separating acrylic acid from a mixture containing acrylic acid and acetic acid, the total number of trays is reduced in the present invention to one-half to one-third of that of the ordinary process, and thus it is not necessary to effect refluxing at a high ratio. That is, the refluxing is carried out economically at a reflux ratio of one-half or less than that of the ordinary process. Furthermore, since the first component used in the present invention has a high boiling point and acrylic acid is diluted with the first component at the column bottom, polymerization of acrylic acid can be greatly restricted during the distillation and separation of acrylic acid. Furthermore, acrylic acid forms an azeotropic mixture of minimum boiling point with the first component, and thus the temperature of the column bottom can be lowered by 2.0° to 10°C, though dependent upon the composition. Therefore, these are great advantages of the present invention from the viewpoint of the prevention of polymerization by means of the dilution of acrylic acid with the first component and the lowering of the temperature at the bottom.

Then, the solution of acrylic acid in the first component from the first distillation column 18 through a line 16 is fed to the top of the fourth distillation column 42 through a line 31 by means of a pump 30, and some portion of acrylic acid, water and the first component are distilled off from the top of the column through a line 32, condensed in a condenser 43 and fed to a decanter 44 through a line 34. An oil layer separated in the decanter 44 is fed to an extraction separator column 46, wherein acrylic acid is extracted with water as an extracting agent, through a line 37, pump 45 and a line 38. The first component is recovered from the top of the column 46 through a line 40. Water as the extract is supplied to the column 46 through a line 39. On the other hand, the extracted acrylic acid solution is withdrawn from the bottom of the column 46, and refluxed to the top of the fourth distillation column 42 through a line 41 and a line 36 after being joined with the aqueous layer separated in the decanter 44 and fed percent by weight of methylethylketone and 14.0 percent by weight of m-xylene is fed to the top of first distillation column provided with 15 perforated trays and distilled at a column top temperature of 25°C under a column top pressure of 40 mmHg. Then the vapor from the head of the column is directly fed to second distillation column provided with an enriching section of 2 perforated trays and a recovery section of 10 perforated trays and distilled at a column top temperature of 15°C under a column top pressure of 35 mmHg. Column top vapor is condensed and separated into an oil layer and an aqueous layer in a decanter, and then the oil layer is refluxed to the second distillation column at a reflux ratio of 0.6. The bottoms of the second distillation column is fed to a third distillation column provided with an enriching section of 8 perforated trays and a recovery section of 6 perforated trays, and distilled at a column top temperature of 55°C under a column top pressure of 70 mmHg. Vapors distilled off from the third distillation column is condensed, and the resulting condensate is washed with water to separate acetic acid, and then an oil layer is refluxed to the third distillation column. The bottoms of the third distillation column is fed to the seventh tray from the top of the first distillation column. Compositions and flow rates at the respective parts of the flow diagram of FIGURE are given in Table 1.

Table 1

|  | 1 | 2 | 3 | 5 | 7 | 9 | 13 | 17 |
|---|---|---|---|---|---|---|---|---|
| flow rate (g/hr) | 1320 | 1111 | 355 | 176 | 935 | 220 | 146 | 250 |
| acrylic acid (wt%) | 20.0 | 9.5 | 73.0 | 60.2 | — | — | 69.2 | 2.0 |
| acetic acid (wt%) | 1.9 | 2.7 | — | 17.0 | — | — | 3.4 | 10.0 |
| water (wt%) | 13.1 | 15.5 | — | — | 18.4 | 100 | — | 88.0 |
| MEK* (wt%) | 51.0 | 60.6 | — | — | 72.0 | — | — | — |
| m-xylene (wt%) | 14.0 | 11.7 | 27.0 | 22.5 | 9.6 | — | 27.4 | — |
| temperature (°C) | 30 | 25 | 71 | 35 | 5 | 5 | 65 | 5 |
| pressure (mmHg) | 760 | 40 | 50 | 55 | — | — | 80 | — |

*methylethylketone through a line 35. An aqueous solution of acrylic acid free from the first component is obtained from the bottom of the fourth distillation column 42 through a line 33.

Acrylic acid and the first component organic solvent are in an azeotropic relation to one another as such, but when water is used as an entrainer for the first component, acrylic acid can be readily obtained in the present invention.

Now, the present invention will be explained in detail by way of examples, but the present invention will not be limited thereto.

EXAMPLE 1

A mixture consisting of 20.0 percent by weight of acrylic acid, 1.9 percent by weight of acetic acid, 51.0

EXAMPLE 2

A solution consisting of 73.0 percent by weight of acrylic acid and 27.0 percent by weight of m-xylene, obtained in Example 1, is fed to the top of fourth distillation column provided with 10 perforated trays, and column top vapor is condensed and separated into two liquid layers in a decanter. The resulting oil layer is sent to a rotary disc extraction column, where acrylic acid is continuously extracted with water. The resulting acrylic acid extract (water) is joined with the aqueous layer separated in the decanter, and refluxed to the fourth distillation column. The distillation is carried out continuously in this manner. Compositions and flow rates at the respective parts of the flow diagram of FIGURE are given in Table 2.

Table 2

|  | 31 | 32 | 38 | 35 | 39 | 40 | 41 | 36 | 33 |
|---|---|---|---|---|---|---|---|---|---|
| flow rate (g/hr) | 1000 | 1180 | 344 | 834 | 302 | 271 | 375 | 1211 | 1031 |
| acrylic acid (wt%) | 73.0 | 50.3 | 21.0 | 62.3 | — | 0.5 | 18.9 | 48.9 | 70.7 |
| m-xylene (wt%) | 27.0 | 25.1 | 78.5 | 3.2 | — | 99.5 | — | 2.2 | — |
| water (wt%) | — | 24.6 | 0.5 | 34.5 | 100 | — | 81.1 | 48.9 | 29.3 |
| temperature (°C) | 25 | 51 | 20 | 20 | 28 | 24 | 24 | 21 | 70 |
| pressure (mmHg) | 760 | 122 | 760 | — | 760 | 760 | 760 | — | 140 |

What is claimed is:

1. A process for separating acrylic acid, which comprises:

1. feeding a mixture comprising acrylic acid, acetic acid, water and a dual solvent consisting of an organic solvent which forms an azeotropic mixture with acrylic acid, acetic acid and water (the first component) and another organic solvent having a boiling point lower than that of acetic acid (the second component) to the top of a first distillation column operated under a pressure of 300 mmHg absolute or less, thereby distilling the mixture, obtaining acrylic acid at a high concentration and a portion of the feed of the first component, almost free from acetic acid from the bottom, and distilling off all of the second component, a portion of the first component, all of water and 10 percent by weight or more of the feed of acrylic acid together with acetic acid from the top as a distillate;
2. feeding the distillate to a middle stage of a second distillation column, thereby distilling the distillate, obtaining the second component and water from the top as a distillate, and obtaining a solution of concentrated acetic acid, acrylic acid and the first component from the bottom or bottoms;
3. feeding the resulting bottoms to a middle stage of a third distilling column, thereby distilling the bottoms under a pressure of 300 mmHg absolute or less, obtaining a mixture containing acetic acid and the first component from the top, and obtaining a solution of acrylic acid and the first component from the bottom as bottoms;
4. feeding the bottoms from the third distillation column to the first distillation column;
5. feeding a solution of acrylic acid in the first component obtained from the bottom of the first distillation column to the top of a fourth distillation column, thereby distilling the bottoms under a pressure of 300 mmHg absolute or less, with water as an entrainer for the first component, obtaining an azeotropic mixture of water and the first component together with acrylic acid from the top as a distillate, and obtaining acrylic acid at a high concentration from the bottom as a product;
6. separating the distillate of the fourth distillation column into an oil layer and an aqueous layer by decantation;
7. feeding the oil layer containing the first component and acrylic acid to the bottom of an extraction column, thereby extracting acrylic acid with water as an extracting agent and recovering the first component as a raffinate;
8. refluxing the resulting aqueous acrylic acid extract after being joined with the aqueous layer separated by the decantation back to the top of the fourth distillation column, and
9. recovering acrylic acid.

2. A process according to claim 1, wherein the first component is ethylbenzene, o-xylene, m-xylene, p-xylene or octane.

3. A process according to claim 1, wherein the second component is methylethylketone, methyl acetate or ethyl acetate.

4. A process according to claim 1 wherein the bottoms of the third distillation column is joined with the bottoms of the first distillation column to feed to the fourth distillation column.

* * * * *